United States Patent
Makarov et al.

(10) Patent No.: US 10,162,062 B2
(45) Date of Patent: Dec. 25, 2018

(54) ELEMENTAL ANALYSIS OF ORGANIC SAMPLES

(71) Applicant: Thermo Fisher Scientific (Bremen) GmbH, Bremen (DE)

(72) Inventors: Alexander A. Makarov, Bremen (DE); Johannes Schwieters, Ganderkesee (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 15/845,867

(22) Filed: Dec. 18, 2017

(65) Prior Publication Data

US 2018/0120446 A1    May 3, 2018

Related U.S. Application Data

(63) Continuation of application No. 15/217,840, filed on Jul. 22, 2016, now Pat. No. 9,880,287.

(30) Foreign Application Priority Data

Jul. 27, 2015 (GB) .................................. 1513167.5

(51) Int. Cl.
     *H01J 49/26*      (2006.01)
     *H01J 49/00*      (2006.01)
     (Continued)

(52) U.S. Cl.
     CPC ............ *G01T 1/00* (2013.01); *H01J 49/0004* (2013.01); *H01J 49/0027* (2013.01)

(58) Field of Classification Search
     USPC ............... 250/281, 282, 288, 423 R, 559.05, 250/559.07, 526
     See application file for complete search history.

(56) References Cited

U.S. PATENT DOCUMENTS 5,767,512 A * 6/1998 Eiden .................... H01J 49/145
                                                                                   250/282
7,230,232 B2    6/2007   Marriott
                  (Continued)

FOREIGN PATENT DOCUMENTS

DE        10354787 A1    6/2005
JP       2008-096245 A    4/2008
              (Continued)

OTHER PUBLICATIONS

Bodenmiller, et al., "Multiplexed mass cytometry profiling of cellular states perturbed by small-molecule regulators", Nature Biotechnology, 2012, 30, pp. 858-867.

(Continued)

*Primary Examiner* — Bernard Souw
(74) *Attorney, Agent, or Firm* — Nicholas Cairns; A. J. Gokcek

(57) ABSTRACT

A method of imaging analyte elements in an organic sample includes providing the sample as a layer on a substrate and reacting the sample on the substrate to produce one or more volatile products that leave the sample while the one or more elements remain in the sample. A majority of the sample layer by weight is removed from the substrate by the reaction and the remaining sample layer is enriched in the one or more elements which are not spatially disturbed by the reaction. The method including subsequently detecting the one or more elements in the concentrated sample layer using an imaging elemental analyzer.

16 Claims, 3 Drawing Sheets

(51) Int. Cl.
*G01T 1/00* (2006.01)
*B01D 59/44* (2006.01)

(56) References Cited

U.S. PATENT DOCUMENTS

| | | | | |
|---|---|---|---|---|
| 8,274,735 | B2* | 9/2012 | Fry | G01N 21/71 356/244 |
| 8,592,759 | B2* | 11/2013 | Maier | G01N 1/4055 250/281 |
| 9,880,287 | B2* | 1/2018 | Makarov | G01T 1/00 |
| 2010/0159506 | A1* | 6/2010 | Parikh | C12Q 1/6883 435/39 |
| 2012/0085903 | A1* | 4/2012 | Trimpin | H01J 49/044 250/282 |
| 2012/0152041 | A1* | 6/2012 | Maier | G01N 1/4055 73/864.91 |
| 2014/0106976 | A1* | 4/2014 | Sachs | G06F 19/18 506/9 |
| 2014/0221241 | A1 | 8/2014 | Nolan et al. | |
| 2015/0005188 | A1* | 1/2015 | Levner | C12Q 1/6804 506/9 |
| 2017/0031033 | A1* | 2/2017 | Makarov | G01T 1/00 |

FOREIGN PATENT DOCUMENTS

| | | |
|---|---|---|
| JP | 2011-158257 A | 8/2011 |
| WO | 01/51907 A1 | 7/2001 |
| WO | 02/054057 A1 | 7/2002 |
| WO | 2006/109544 A1 | 10/2006 |
| WO | 2014/063246 A1 | 5/2014 |
| WO | 2015/128490 A1 | 9/2015 |

OTHER PUBLICATIONS

Giesen et al., "Multiplexed Immunohistochemical Detection of Tumor Markers in Breast Cancer Tissue Using Laser Ablation Inductively Coupled Plasma Mass Spectrometry", Analytical Chemistry 2011, 83, pp. 8177-8183.

Muccio et al., "Isotope ratio mass spectrometry", Analyst, 2009, 134, pp. 213-222.

Osburn, et al., "The use of wet chemical oxidation with high-amplification isotope ratio mass spectrometry (WCO-IRMS) to measure stable isotope values of dissolved organic carbon in seawater", Limnol. Oceanogr.: Methods 5, 2007, pp. 296-308.

* cited by examiner

ELEMENTAL ANALYSIS OF ORGANIC SAMPLES

CROSS-REFERENCE TO RELATED APPLICATIONS

The present application is a continuation under 35 U.S.C. § 120 and claims the priority benefit of co-pending U.S. patent application Ser. No. 15/217,840, filed Jul. 22, 2016. The disclosure of the foregoing application is incorporated herein by reference.

FIELD

The invention relates to the field of imaging mass spectrometry, in particular imaging elemental mass spectrometry. In certain aspects, the invention relates to analysing the distribution of particular elements in a biological sample, which may have been introduced into the sample as elemental tags or may occur in the sample naturally.

BACKGROUND

The distribution of so-called inorganic elements in biological samples is important to determine for numerous reasons. Inorganic elements generally refers to elements other than those that typically form organic material such as C, H, N and O. Usually, the inorganic elements of interest are heavier than oxygen and typically are metallic or semi-metallic elements. The natural distribution of inorganic elements in biological samples reveals important information about biological processes at gene, protein and metabolite levels as reflected by the burgeoning field of metallomics. In addition, in an approach called elemental tagging, a number of so-called elemental tags (which may also be termed markers) can be added artificially to targets in the sample, typically with the help of specific binding agents (for example antibodies, aptamers, metabolic labels, etc.) to focus on specific targets or processes in biological systems. Many different detection techniques can be employed for measuring the abundance of the elements of such tags, such as radioactivity, light (e.g. fluorescence or absorption), which includes X-ray fluorescence (XRF), secondary electron spectrometry (SES), X-ray photoelectron spectroscopy (XPS), electron micro-probe analysis (EMPA), secondary ion mass spectrometry (SIMS), laser plasma ionisation mass spectrometry (LPI MS) and inductively-coupled plasma mass spectrometry (ICP MS), etc.

In the case of fluorescence based assays, the techniques may be fast but suffer from low sensitivity and are limited to one or a few targets per assay in comparison to mass spectrometric techniques such as SIMS or ICP MS.

Mass spectrometry techniques allow a high degree of multiplexed measurement of elements in parallel, for example using multi-collector magnetic sector, time-of-flight, ORBITRAP or Fourier transform ion cyclotron resonance analyzers. However, when spatially resolved analysis is required, for example for imaging of tissues, low abundance of elements poses a challenge to all these analyzers as spectra become dominated by intense matrix peaks from tissues. These matrix peaks could originate from polyatomic species constituting bulk of tissues, with major elements being not only C, H, N, O, but also S, P, alkali metals (Na, K), etc. Although polyatomic species could in principle be eliminated in RF-only gas-filled reaction cells (e.g. U.S. Pat. No. 5,767,512, U.S. Pat. No. 7,230,232), such reactions are highly analyte dependent, could affect metals of interest and generally result in losses of these ions of interest. This is especially noticeable for imaging applications where the starting amount of analyte is limited from the start.

ICP MS with laser ablation (LA/ICPMS) is known to have a negligible contribution of polyatomic species and therefore became one of preferred methods for elemental imaging of tissues as shown for example in WO2010/133196, DE10354787, WO0151907, WO02054057, U.S. Pat. No. 8,274,735 WO 2014/063246, WO2015128490 and others. An acquisition rate of up to several tens of pixels/second with micrometer ($\mu$m) spatial resolution has been demonstrated. Even with such rate, several hours are still needed for the acquisition of a single image. Further increases in acquisition speed, however, are limited by the temporal spreading of the signal due to spreading of the sample plume during its transport from the surface to the ICP torch, as most of the transport process takes place at atmospheric pressure and at low transport velocities. Atmospheric pressure is essential for ICP operation. Along with this spreading, transfer lines may get coated with aerosol formed by sample material, thus resulting in carryover and contamination of the sample introduction unit. With higher throughput required by any clinical application, excessive contamination will drive the costs of analysis and service time.

Transfer of the ionisation process into vacuum as known in the art for SIMS or laser plasma ionisation approaches results in a very long scanning process due to a relatively low current of generated ions of interest and hence long exposure times being required.

Such low current of generated ions is often caused not so much by ionising agent or low efficiency of secondary ion generation but rather by the relatively low concentration of natural elements or tags in the cell/tissue matrix. This also precludes utilising other methods of multi-channel elemental imaging such as SES, micro X-ray fluorescence ($\mu$XRF), etc. Another problem is the rapid contamination of the vacuum chamber and analyzer components with the organic matrix material. For example, analysis of just one typical 5 $\mu$m-thick tissue section of 100 mm$^2$ area could completely contaminate an instrument if fully utilised for analysis in order to satisfy sensitivity requirements. In the case of SIMS, there is an added problem of relatively slow rate of sample removal that decelerates analysis of typical tissue samples which are often at least 3-5 micrometers thick.

In the field of isotope ratio mass spectrometry (IRMS), especially where the isotope ratio analyzer is interfaced to a gas chromatography (GC) or liquid chromatography (LC) separation stage, samples are oxidised to produce gases such as $CO_2$, $NO_x$, $H_2O$, which are analysed to determine isotope ratios of elements such as C, N and/or O. The oxidation may take place in a combustion oven (e.g. in GC-IRMS), as described in Z. Muccio and G. P. Jackson, Isotope ratio mass spectrometry, Analyst 134 (2009) 213-222, or it may involve a wet chemical oxidation process (e.g. in LC-IRMS), as described in C. Osburn and G. St-Jean, Limnology and Oceanography: Methods 5 (2007) 296-308. "Dry" oxidation e.g. by UV-ozone, is also routinely used for removal of contaminations on surfaces of semiconductors, glass, etc.

The present invention has been made against this background.

SUMMARY

The invention relates to an approach that can be used for processing tissue samples prior to their analysis by any of the above-mentioned methods. As the thickness of tissues is typically quite comparable to the required spatial resolution of analysis, carefully controlled conditions of oxidation can result in gradual removal of organic matrix while limiting diffusion of heavier elements or tags away from their original position. As a result, a much lower amount of material will be desorbed or removed during sampling, at the same time delivering required analytes of interest and imaging information.

The present invention provides an improved approach to elemental analysis of organic samples by a pre-concentration of elements to be analysed (which may be variously termed herein elements of interest or analyte elements). These are typically the inorganic elements present in the sample, either naturally or through introduction as a tag. This enables a variety of methods for elemental imaging to be used that have been ineffective in earlier approaches.

According to one aspect of the invention there is provided a method of imaging one or more analyte elements in an organic sample, comprising:

providing the sample as a layer on a substrate;

reacting (preferably oxidizing) the sample on the substrate to produce one or more volatile products that leave the sample and enter the gas phase, whilst the one or more analyte elements remain in the sample, whereby a majority of the sample layer by weight is removed from the substrate by the reaction (preferably oxidation) and the remaining sample layer is enriched or concentrated in the one or more analyte elements; and detecting the one or more analyte elements in the enriched or concentrated sample layer using an imaging elemental analyzer.

Preferably, the analyte elements are not spatially disturbed by the reaction by more than the spatial resolution of the imaging analysis. Although some individual analytes may be disturbed by a greater distance than this, preferably on average the analyte elements are spatially disturbed by the reaction not more than the spatial resolution of the imaging analysis.

According to another aspect of the invention there is provided an apparatus for imaging one or more analyte elements in an organic sample, comprising:

a reaction chamber (preferably an oxidation chamber) to receive the sample, wherein the sample has been provided as a layer on a substrate;

wherein the reaction (preferably oxidation) chamber comprises an electromagnetic radiation source and/or an inlet for introducing into the chamber one or more chemical or ionic oxidizing agents for oxidizing the sample to produce one or more volatile products that leave the sample and enter the gas phase, whilst the one or more analyte elements remain in the sample, whereby a majority of the sample layer by weight is removed from the substrate by the oxidation and the remaining sample layer is enriched in the one or more analyte elements; and an imaging elemental analyzer in a detection chamber for detecting the spatial distribution of said one or more analyte elements in the enriched sample layer.

According to a further aspect of the invention there is provided a dedicated imaging elemental analyzer for imaging one or more analyte elements in an organic sample, the analyzer comprising:

a chamber for housing an organic sample containing one or more analyte elements to be imaged, wherein the pressure inside the chamber surrounding the sample is in the range $10^{-5}$ to $10^{-2}$ mbar;

at least one primary irradiation means selected from: (i) an ion gun for irradiating the sample with a high intensity beam of primary ions, wherein the primary ions are formed in the ion gun at a pressure below 1 mbar, wherein the ion gun is for focusing the beam of primary ions to a localized spot on the surface of the sample and for moving the spot to a plurality of locations on the surface of the sample over time; (ii) a laser, preferably high-power laser, for irradiating a localized spot on the surface of the sample to produce ions and for moving the spot to a plurality of locations on the surface of the sample over time;

a gas-filled RF ion guide for receiving produced ions comprising the analyte elements released from the sample in response to the primary irradiation, wherein the RF ion guide prevents onward transmission of all ions of m/z below the mass or mass range of the analyte elements; preferably at least some of produced ions undergoing ion-molecule reaction in said ion guide; and a time of flight (TOF) mass analyzer for receiving the produced ions or reaction products of the produced ions from the RF ion guide, wherein the TOF mass analyzer is configured to have a repetition rate of at least 5 kHz, preferably 50-100 kHz.

According to an additional aspect of the invention, there is provided an elemental analyzer for mass analyzing, and preferably imaging, one or more analyte elements in a sample, the analyzer comprising:

a chamber for housing a sample containing one or more analyte elements, preferably wherein the pressure inside the chamber surrounding the sample is in the range $10^{-5}$ to $10^{-2}$ mbar;

a laser for irradiating a localized spot on the surface of the sample and causing laser plasma ionisation of at least one or more analyte elements in the sample, preferably wherein the laser is for moving the spot to a plurality of locations on the surface of the sample over time;

a reaction cell for receiving ions of the one or more analyte elements produced by laser plasma ionisation, wherein a composition and emittance of the ions is altered, preferably reduced, as the ions travel through the reaction cell; and a mass analyzer, preferably a time of flight (TOF) mass analyzer, for receiving ions of the one or more analyte elements and/or ions of reaction products of the one or more analyte elements from the reaction cell, preferably wherein the TOF mass analyzer is configured to have a repetition rate of at least 5 kHz.

PREFERRED EMBODIMENTS

A pre-concentration of analyte elements, which may be tags, on the substrate is implemented by enabling oxidation reactions that convert the organic matrix or material of the sample into volatile gases that are removed to waste, while inorganic elements of interest remain on the substrate. Accordingly, preferably the volatile products substantially do not contain the analyte elements. Furthermore, the inorganic elemental species may end up in oxidised form on the substrate (i.e. in the oxidised sample).

The enriched analyte elements in the remaining sample may then be detected using an imaging elemental analyzer. The detection can take place at a different time and location (e.g. in a different chamber) to the oxidation. For example, the detection typically takes place subsequently to the oxidation. From the detection, an image may then be generated of the detected elements in the sample. The imaging elemental analyzer may thus comprise a data acquisition system that receives input from the detection of the one or more elements and generates an image of the one or more elements in the sample. The imaging elemental analyzer is desirably a device capable of rapid imaging of multiple elements in parallel, such as a device comprising a mass analyzer or polychromator.

The initial sample is an organic sample, i.e. comprised of mostly organic matter and containing a minor or trace amount of inorganic matter including the analyte elements to be detected. It may be any sample comprising an organic matrix in which one or more analyte elements are contained, which are desired to be detected. The organic matrix constitutes the majority of the mass or weight of the sample. The organic matrix may constitute at least 60%, or at least 70%, or at least 80%, or at least 90%, or at least 95%, or at least 99%, or at least 99.9%, or at least 99.99%, of the sample layer by weight.

The sample may be a biological sample, i.e. of biological origin. The biological sample may be derived from an organism. The organism may be plant or animal or bacteria. In a preferred application of the invention, the biological sample is tissue and/or individual cells.

The analyte elements are generally elements other than those that typically form the organic matrix (C, H, N and O). Typically, the analyte elements are heavier than oxygen. Typically, the elements are metallic or semi-metallic (metalloid) elements. The elements preferably may be metals heavier than mass 16. The elements may be heavy metal elements. The elements may be selected from rare-earth elements (lanthanides) or transition metals or post-transition metals, or alkali metals, or alkaline earth metals or metalloids. The elements may be radioisotopes. In the case of a plurality of analytes, the elements may be any combination of the above classes. The one or more analyte elements may comprise two or more different isotopes of the same element.

The one or more analyte elements may be naturally occurring in the sample, e.g. as trace elements in a sample, such as a biological sample. Such elements could be also used as internal standards for improved quantitation. The one or more analyte elements may have been introduced into the sample as elemental tags, e.g. using methods of elemental tagging known in the art. One class of preferred elemental tags is rare-earth elements (particularly lanthanides). The tags may be radioisotopes, detectable by a radioactivity analyzer.

The one or more elemental tags may be provided as nanoparticles, nanorods, mass dots or quantum dots, for example as described in US 2014/0221241 A1.

The one or more elemental tags may be provided as purified isotopes of rare-earth or other elements or combinations of them in a pre-determined ratio.

The one or more elemental tags may be attached to a binding member that binds to a target in the sample. The binding member may be specific so that it binds to a specific target in the sample. Each elemental tag (each mass), where there is more than one, may be attached to a different binding member that is specific for a particular target in the sample. Thus, a plurality of different targets may be present. Preferably each elemental tag is bound to a different specific binding member. The one or more elemental tags may be attached to the binding member directly or indirectly (e.g. via a linker). The binding member may be selected from a stain (e.g. fluorescent stain), polypeptide, polynucleotide, antibody, affibody, and an aptamer), or a SOMAmer™. The target may be any organic molecule in the sample. In the case of biological samples, the target may be a biomolecule, for example, a macromolecule such as selected from proteins, polysaccharides, lipids, and nucleic acids, as well as small molecules such as metabolites and natural products.

The target may be an antigen. As an example, the elemental tag may be attached to an antibody so that it becomes attached to an antibody-antigen complex after the antibody binds to an antigen. The, or each, target is preferably a biomarker.

In some embodiments, the one or more elemental tags may have been metabolically introduced into the sample, e.g. within food or support media. The elemental tag may therefore form part of a metabolic label.

The tagging can also utilise multiple elements in a barcode manner, for example as described in US 2014/106976 and in B. Bodenmiller et al., Nature Biotechnology 30 (2012) 858-867.

The one or more elemental tags may comprise two or more different isotopic tags of the same element.

The sample is prepared as a layer on a substrate. The sample is preferably provided as a thin layer, more preferably no more than (i) 20 µm, or (ii) 10 µm, or (iii) 5 µm, or (iv) 3 µm in thickness.

The substrate is typically a slide, e.g. a planar slide. The substrate or slide may be a metal, glass or ceramic flat plate. In some embodiments, the substrate may have a surface of titanium dioxide. For example, any of the aforesaid slides or flat plates may have a surface of titanium dioxide. For this purpose, the substrate may be coated with a layer of titanium dioxide, preferably in the form of a titanium dioxide film or immobilised titanium dioxide particles. One of preferred embodiments of substrate is a standard microscope glass slide with indium-tin oxide coating as known in the art.

In some embodiments, the sample may comprise a fixed and embedded tissue sample, e.g. a formalin-fixed, paraffin-embedded (FFPE) tissue, preferably cut by a microtome, preferably to 3-5 µm thickness.

In some embodiments, the sample may comprise individual cells deposited on a substrate, e.g. from a flow cytometer or high-content screening device. The cells may be deposited e.g. in a grid-like pattern (for instance, at every 50 µm, or every 30 µm in X and Y directions). A typical cell size in this case may be up to 5 µm or up to 10 µm, or 5-10 µm. An example of grid-like sample preparation is shown in WO2014/063246.

In some embodiments, the sample may comprise cell culture on a growth media, e.g. a microbial or bacterial culture on a thin layer of growth media such as agarose. Preferably, the culture is up to 10 µm, or up to 20 µm thick. Typically, growth media will be thicker than this culture thickness. The culture samples could be oxidized as they are (e.g. using plasma etching), but oxidation and subsequently sampling will not be so effective for thick layers of growth media. Preferably, such a sample should be cut down to the thin culture layer or close to the thin culture layer, to improve oxidation and sampling.

In some embodiments, the sample may be deposited by an autosampler (e.g. including autosamplers of the following types: flow focusing, acoustic droplet ejection, induction, etc.).

The sample may be deposited on the substrate, e.g. by the autosampler, as individual droplets in or on a grid-like pattern (e.g. every 30-50 µm in X and Y direction), or in or on microarrays or in a multi-well plate.

In some embodiments, a plurality of samples (which may be different samples) could be deposited on one substrate in different locations on the substrate, e.g. in a grid-like pattern, as mentioned above.

The tagging of the sample with one or more analyte elements may take place before or after providing the sample on the substrate, preferably after.

In certain embodiments of the invention, the analyte elements are not elemental tags but naturally occurring elements in the sample (so-called native elements). Thus, in certain embodiments, the sample is left unprocessed in the sense of not being tagged. This type of method may be used in applications to yield the distribution of native inorganic elements, such as metal elements, in the sample, particularly native heavier inorganic elements (e.g. metals, e.g. Fe, Zn, Sn, etc., e.g. for metallomics experiments).

Once preparation of the sample on the substrate is finished, the sample can be transferred to a processing chamber (e.g. the oxidation chamber) for the oxidation step. Sample could be optionally lyophilised prior to this transfer to reduce amount of water in it. The sample may be transferred to a hermetic reaction chamber where it is subjected to one or more, preferably strong, oxidising agents. In one embodiment, oxidation could comprise heating the sample in a flow or atmosphere of oxygen to effect combustion. Many different combustion or oxidation processes may work as long as the analyte elements or tags are not spatially disturbed by the process more than the desired spatial resolution of the analysis. The finer the spatial resolution of the analysis (e.g. 1 micron or 3-5 micron spatial resolution may be typically used), the gentler the oxidation process should be. Under no circumstances is the formation of gas bubbles or boiling allowed as it would drastically disturb the original spatial distribution of elements. In some embodiments, when the required spatial resolution is of the order of tens of microns, more violent and rapid oxidations may be used. Though gas-phase oxidation is preferred, wet chemical oxidation and etching by RF discharge plasma could be also implemented as long as the requirement of low disturbance of spatial distribution of elemental tags remains fulfilled. A combination of several oxidation processes could be used to accelerate enrichment of the remaining sample.

The hermetically sealed chamber may be a reaction chamber that is separate from a detection chamber wherein the detecting or analysis takes place, or it may be the same chamber as the detection or analysis chamber. Accordingly, in some embodiments, the oxidation chamber is the same chamber as the detection chamber, i.e. there is a single oxidation and detection chamber in such cases. Preferably, the oxidation is performed in a different chamber to the detection chamber in which the imaging elemental analyzer is located. Accordingly, the oxidized sample typically has to be transferred from the reaction (i.e. oxidation) chamber to the detection/analysis chamber (in which the imaging elemental analyzer is located). Thus, in such cases, once the oxidation process is finished, the substrate (slide) is transferred into a vacuum chamber for elemental imaging by any one of numerous applicable methods (i.e. the process overall is a two step process: conversion/concentration followed by vacuum-based imaging analysis).

Preferably, the oxidizing step comprises exposing the sample to one or more oxidising agents, optionally wherein the sample is heated during the oxidizing step. The apparatus, e.g. the reaction chamber, may therefore further comprise a heater for heating the sample during the oxidizing step. The reaction chamber may be a vacuum chamber. The oxidation may be performed in the chamber at elevated (above atmospheric) pressure, at atmospheric pressure, or at reduced pressure, i.e. less than atmospheric pressure. The reduced pressure regime may be between 100 and 1000 mbar, or between 1 and 100 mbar. In the latter case, a DC or RF gas discharge may be used to facilitate oxidation. The one or more oxidizing agents may be selected from (i) electromagnetic radiation and/or (ii) one or more gas-phase chemical oxidizing agents and/or (iii) ions or electrons and/or (iv) one or more liquid-phase chemical oxidizing agents. Thus, connected to the inlet may be a source of one or more chemical oxidizing agents, preferably wherein the one or more oxidizing agents are selected from: ozone, hydrogen peroxide, and, as an example of liquid-phase oxidizing agents, a persulfate (e.g. ammonium, sodium or potassium persulfate). The latter is preferably used with a catalyst, e.g. phosphoric acid and silver nitrate. The agents may be admitted to the chamber at a reduced pressure (less than atmospheric) together or sequentially.

Preferred gas-phase oxidising agents include ozone and hydrogen peroxide. The sample may be oxidised by the action of electromagnetic radiation, in particular light, especially light with wavelength <400 nm (preferably UV light but in some embodiments X-rays). For ozone oxidation example, a UV-ozone oxidation chamber could be used at atmospheric or elevated pressure as known in the art, with additional feeding of wet air or wet oxygen and supplementary activation with 254 nm and/or 185 nm UV light. When oxidation is carried out using light, the sample optionally resides on a photocatalytic surface of the substrate (preferably titanium dioxide surface), which is subjected to the light. The oxidising light preferably irradiates the surface at intensities above 0.1, or above 1.0, or above 10 milliWatt/$cm^2$, or in the range 0.1-10 milliWatt/$cm^2$.

Accordingly, the one or more oxidizing agents can be: (i) electromagnetic radiation and the oxidizing step comprises irradiating the sample with light of wavelength less than 400 nm wherein the substrate acts as a photocatalyst to oxidize the sample, or (ii) one or more chemical oxidizing agents and the oxidizing step comprises exposing the sample to one or more chemical oxidising agents selected from: ozone and hydrogen peroxide.

A similar effect is achieved by contacting the sample with low-pressure RF or DC gas discharge so that the surface of the sample is bombarded by charged particles from plasma and oxidation is supplemented by sputtering. This process is typically faster and more "abrasive" comparing to UV-ozone treatment and therefore more suitable for larger lumps or crystals of elements.

The oxidation processes described are suitable to cause rapid oxidation of the organic matrix atoms: e.g. any one or more of the following oxidation reactions: C→CO, $CO_2$, N→NO, $NO_2$, H→$_2$O, etc. Thus, the one or more volatile products preferably comprise one or more oxides of C, H, and/or N. Optionally S is converted to $SO_2$ or other oxides of sulphur. The generated volatile products of the oxidation are preferably pumped away, thus carrying away a portion, preferably most, of the sample mass. Simultaneously, the analyte elements, e.g. heavier elements (heavier than O), and especially the metallic elements, do not form volatile products and therefore remain on the continuously-thinning layer of sample, mainly in an oxidised form. Thus, the sample becomes or enriched in the one or more analyte elements prior to analysis by the imaging elemental analyzer. Preferably, the location of the analyte elements in the sample on the substrate does not change (at least not significantly or substantially) as a result of the reaction. For this purpose, the reaction rate may be controlled so that no bubbling or boiling takes place and the location of the analyte elements is not changed. Diffusion is low for heavier elements or larger lumps or crystals of such elements, but the reaction rate should be chosen low enough to keep the length of diffusion below a) 1× sample thickness D, b) 0.5*D, c) 2*D. Thereby, the image of the analyte elements in the sample so determined represents the distribution of the analytes elements in the original sample (prior to reaction).

Preferably, the reaction step removes the majority of the sample layer by weight from the substrate. More preferably, in order of preference, the reaction removes at least 60%, or at least 70%, or at least 80%, or at least 90%, or at least 95%, or at least 99%, or at least 99.9%, or at least 99.99% of the sample layer by weight. In some embodiments, the reaction step removes between 90% and 99% or between 90% and 99.9% of the sample layer by weight.

Preferably, the reaction step is continued until the oxidation process substantially reaches saturation, or close to it, such that most of the organic matrix is removed (most preferably >90% or >95% or >99% by weight), and the typically heavier analyte elements are sufficiently concentrated for the subsequent analysis.

Preferably, the reaction step comprises controlling the rate of the oxidation process by regulating the supply of oxidising agents (including light or ions where used) and/or temperature of the sample. In some embodiments, the production of at least one of the volatile products and/or their concentration in the gas phase can be monitored for process control (e.g. using one or more gas sensors), e.g. to determine the time to stop the oxidation reaction (to monitor completeness of oxidation so that the share of undesired products is minimised), or speed of oxidation (so that it is not too violent, which may disturb the position of the elements or tags), as well as for diagnostics, e.g. to measure the relative content of certain elements in the volatile products or their isotopes to obtain additional types of information about the sample, such as side products, contaminants etc. Another embodiment of reaction chamber includes using sample slides made from porous inorganic material through which oxidizing agents (ozone, hydrogen peroxide, persulfate) are forced from a supply underneath. This approach relies on fast diffusion of these agents through the thin tissue section and therefore is more likely to result in bubbling and boiling. However, in this case another porous slide can be located just a few micrometers away from the tissue to "catch" non-volatile oxides of heavier elements carried off by resulting gas flow. This pass-through approach allows faster oxidation process without any loss of analytes of interest even when bubbles are formed.

Accordingly, in some embodiments, the step of reacting the sample on the substrate comprises passing one or more oxidizing agents from an opposite side of the substrate to the sample through pores in the substrate to reach the sample, there being a second substrate in proximity to but spaced apart from and facing the sample, whereby the one or more oxidizing agents diffuse through the sample producing volatile products from the sample and causing non-volatile analyte (heavier) elements and/or their oxides to reach and remain on the surface of the second substrate for detection by the imaging analyzer. With a sufficiently small gap between the two substrates, e.g. 5-10 micrometers, the gap is such that the spatial distribution of the analyte heavier elements in the sample is substantially preserved after the elements are transferred to the second substrate. At least preferably on average the analyte elements transferred to the second substrate are spatially disturbed by the oxidation not more than the spatial resolution of the imaging analysis to be performed.

The imaging elemental analyzer may be selected from: a secondary electron spectrometer (SES), an X-ray photoelectron spectrometer (XPS), an X-ray fluorescence (XRF) spectrometer, energy dispersive X-ray microanalyzer, a radioactivity analyzer, ion mobility analyzer, and a mass spectrometer (MS), preferably a mass spectrometer.

Preferably, detecting the one or more elements comprises irradiating the concentrated sample with a beam of primary particles, such as ions or photons, focused to a localized spot on the surface of the sample to emit secondary particles from the spot and analysing the secondary particles to determine the presence and optionally quantity of the one or more elements at the spot, wherein the spot is moved to a plurality of locations on the surface of the sample over time, thereby to obtain an image of the one or more elements in the sample wherein each location of the spot on the surface of the sample corresponds to a pixel of the image. At least some of the secondary ions are ions that comprise the one or more of the analyte elements. The secondary particles may be analysed directly as they are emitted from the sample surface (e.g. if the secondary particles are elemental ions already, or their oxide ions, and the analyzer is a mass spectrometer; or if the secondary particles are photons or electrons that are emitted from the one or more analyte elements being characteristic of the or more analyte elements) or they may be converted into another form for analysis, e.g. converted from emitted neutral or ionic polyatomic particles into monoatomic elemental ions for mass analysis (e.g. in an ICP ion source of a mass analyzer), or converted into reaction products (via ion-molecule or ion-ion reactions) in a reaction or collision cell upstream of the mass analyzer.

Thus, the imaging elemental analyzer may comprise a primary particle source (e.g. an ion gun) or photon source (e.g. a laser) for generating the beam of primary particles and focusing the beam to a localized spot on the surface of the sample to emit secondary particles from the spot and comprises a secondary particle analyzer for analysing the secondary particles to determine the presence and optionally quantity of the one or more elements at the spot, wherein the primary particle source is configured to move the spot to a plurality of locations on the surface of the sample over time, thereby to obtain an image of the one or more elements in the sample wherein each location of the spot on the surface of the sample corresponds to a pixel of the image. The imaging elemental analyzer can acquire the image at a rate of at least 100 pixels per second or at least 1000 pixels per second or in the range of 1000-10000 pixels per second.

Preferably, the primary particles are selected from IR or visible light or UV or X-ray photons, electrons and ions. Also preferably, the secondary particles are selected photons (especially X-rays), electrons and ions.

Preferably, the energy of the primary particles exceeds 1 keV.

Preferably, the primary particles are ions, and thus more preferably the primary particle source comprises an ion gun. Preferably, the primary ion beam is continuous. In some embodiments, however, the primary ion beam is pulsed. Preferably, the primary particles are ions formed at a pressure below 1 mbar and the secondary particles are ions for analysis by a mass analyzer. Thus, the imaging elemental analyzer may be an imaging secondary ion mass spectrometer (SIMS) configured to be pumped to a vacuum, wherein the primary particles are ions formed in the source at a pressure below 1 mbar and wherein the secondary particles are ions for analysis by a mass analyzer of the SIMS.

Scanning of the sample may be implemented by steering plates of the ion gun and/or by moving a stage on which the sample or substrate is located. Higher spatial resolution for sub-cellular and sub-organelle resolution could be achieved, for example, by using a thinner sample (e.g. tissue slice thickness of 3 μm and thinner), and/or stronger spatial focusing of the primary beam and/or lower primary beam current to reduce space charge defocusing.

Preferably, the beam of primary ions has an intensity of up to 100 nA per 1 μm size of the spot (i.e. 1 μm diameter spot). Preferably, the beam of primary ions has an intensity of at least: a) 1 pA, or b) 100 pA, or c) 1 nA, or d) 10 nA, in a 1 μm size spot.

If photons are used as primary particles, preferably fluence in ionisation pulse exceeds a) 5, b) 10, c) 20, d) 50 J/cm$^2$ that allows dense plasma to be formed and high degree of ionisation achieved as known in the art. A laser device is preferably used as the photon source. Preferably such laser is a pulsed laser, wherein the pulses preferably have the aforementioned fluence in each pulse. Any laser wavelength could be used, but preferably not longer than the required spatial resolution and preferably with absorbance length (i.e. length for laser intensity to be attenuated by a factor of e (Euler's number)) not more than a) 100 nm, b) 200 nm, or c) 500 nm. For example, preferably the fluence in the irradiation pulse exceeds a) 5, or b) 10 J/cm$^2$ (or the other preferred fluences) and has an absorbance length not more than 500 nm. Most preferably, solid-state lasers like Nd:YAG are used for ionisation, with or without frequency multiplication (the latter might be required to obtain sufficiently short absorbance lengths).

Laser radiation could illuminate the sample from the front or from the back. The latter case offers easier focusing of laser beam, orthogonality of the laser light to the sample and hence a round spot—but high-radiation threshold glass should be used to avoid radiation damage of the slide. In case of front illumination, laser light will typically come at an angle (to simplify more demanding requirements of extraction ion optics) while optical observation of focal spot could be done from the back side through the glass slide.

In embodiments where the imaging elemental analyzer comprises a mass analyzer for determining the m/z of emitted ions or their reaction products, the mass analyzer may be selected from: a time-of-flight (TOF) mass analyzer, a distance-of-flight mass analyzer, a quadrupole ion trap mass analyzer, an electrostatic trap (EST) mass analyzer (such as an orbital EST, e.g. ORBITRAP mass analyzer), an Ion Cyclotron Resonance mass analyzer (FT-ICR), especially an EST or ICR employing imaging current detection, a magnetic sector mass analyzer, and an array, or any combination thereof, more preferably the mass analyzer comprises a TOF mass analyzer. The TOF analyzer may be an orthogonal acceleration TOF analyzer (OA-TOF), especially a high repetition rate OA-TOF as known in the art, preferably with gridless orthogonal acceleration, optionally with one or more ion mirrors providing single or multiple reflection of ions in the analyzer (more preferably single reflection). The mass analyzer preferably is capable of analysing a continuous secondary ion beam over a wide mass range of ions simultaneously, such as TOF or ORBITRAP mass analyzer or orbital electrostatic trap. Preferably, there are a plurality of analyte elements to be analysed (imaged), e.g. from a plurality of elemental tags. More preferably there are at least 5, or at least 10 analyte elements or elemental tags analysed by the elemental analyzer. A mass spectrometer, especially a TOF mass analyzer, is easily capable of such multichannel analysis on short timescales. A combination of analyzers could be used for multi-modal analysis, e.g. TOF mass analyzer for nominal-mass elemental analysis and an electrostatic trap with image current detection, such as an ORBITRAP mass analyzer for organic analysis or high-resolution of interferences.

The secondary ions of the analyte elements (tags) may be emitted into an intermediate vacuum pressure of $10^{-5}$-$10^{-2}$ mbar, rather than a higher vacuum, thus reducing requirements on sample desiccation and transfer time in comparison to high-vacuum (e.g. SIMS) instruments. Thus, the chamber for housing the sample being irradiated with primary ions has a pressure inside the chamber surrounding the sample in the range $10^{-5}$ to $10^{-2}$ mbar.

Preferably, the secondary particles for analysis by the mass analyzer are transferred into an RF ion guide after they are emitted from the surface and are delivered from the ion guide to the mass analyzer. Thus, the imaging elemental analyzer preferably comprises an RF ion guide for receiving the secondary ions after they are emitted from the surface and transferring the secondary ions into the mass analyzer. The ion guide in use is preferably gas filled e.g. to a pressure of at least $10^{-2}$ mbar whereby all m/z below the mass range of the analyte elements, or their oxides where the oxide of the elemental ion is detected, are eliminated. The ion guide thereby may advantageously function as a reaction or collision cell The ion guide in some embodiments may contain a reactive gas for producing reaction products with the secondary particles (e.g. via ion-molecule reactions), wherein the secondary particles are ions that comprise one or more of the elements. For example, the reactive gas may comprise a gas such as NO, or $O_2$ to completely oxidise most of the analyte elements (e.g. native metals or rare earth elements) to oxides as known in the art (see e.g. G. Koyanagi, D. Bohme. J. Phys. Chem. A, 105 (2001) 8964-8968) and thus reduce interferences (by mass shifting those elemental peaks by 16 amu, while other peaks remain unshifted) and increase the number of channels to be analysed in parallel. If a reactive gas is used, all oxides and other molecular interferences could be eliminated. Thus, preferably at least some of the produced (secondary) ions undergo ion-molecule reaction in the ion guide. The ion guide can have a cooling effect on the ions as they are transmitted through the ion guide. In this way, the energy distribution or emittance of the ions at the output of the ion guide is changed (preferably reduced) relative to the ions at the entrance of the ion guide. Accordingly, in some embodiments, a composition and/or an energy distribution of the ions at the output of the ion guide can be changed relative to the ions at the entrance of the ion guide. The ion guide is thus preferably configured as a reaction cell. It is known in the art that gases like $N_2O$, $NO_2$, $O_2$, $CO_2$, NO facilitate oxidation of many metal ions, in particular with m/z>100, that in turn allows to reduce a number of analysis channels per isotope to one. Also, $NH_3$ and NO could be used to get rid of polyatomic species like hydrids prior to this oxidation. The reaction cell can therefore be filled with one or more such gases acting as one or more reactive gases in the reaction cell.

In certain embodiments, as heavier elements get concentrated on the slide surface, they may form a new type of matrix that may start to affect the analysis resulting in reduced ionisation yield or topography-related effects. For example, phosphorus and phospholipids may concentrate around cell membranes (including nuclear membrane) and from DNA—within nucleus. Alkali metals (e.g. Na, K) might appear at different concentrations on the opposite sides of membranes, etc. Therefore, in such embodiments, one or more of these elements (e.g. P, Na, K) should preferably be also monitored and corrections applied according to their abundances. For example, in some embodiments, if the concentrations of such common elements (e.g. Na, K etc.) do not follow their expected concentrations in known regions of the sample, then the observed deviation from their expected concentration can be used as a basis to correct detected abundances of the analyte (typically heavier) elements.

In addition, further treatment could be applied to the sample, e.g. application of additional matrix to enhance ionisation and compensate for matrix effects, etc. For example, a uniform coating comprising one or more elements to assist ionisation can be applied to the sample (e.g. oxygen is known to increase a yield of secondary ions of metals). Also, in the case of irradiation and/or ionisation by a laser, an organic light-absorbing layer can be added to the sample.

Preferably, the mass analyzer is a TOF mass analyzer, especially OA-TOF, and the repetition rate of the TOF mass analyzer is at least or higher than (a) 5 kHz, or (b) 20 kHz, or (c) 50 kHz, or (d) 100 kHz. The repetition rate may be 50-100 kHz for example. The repetition rate here refers to the rate of pulsing ions into the TOF analyzer for separation of the ions by their mass to charge ratio (m/z). A detected ion signal (intensity versus m/z) is obtained from each pulse of ions into the TOF analyzer. A summation of the detection signals from each pulse of ions into the TOF analyzer at a given spot on the sample surface may be used to generate the corresponding pixel of the image of the elemental distribution. Preferably, the image of the elemental distribution is acquired at a rate of at least 100 pixels per second or at least 1000 pixels per second or in the range of 100-1000 pixels per second. Preferably, the mass analyzer is configured to detect elements or oxides of the elements.

Preferably, the analysis of each spot using the TOF mass analyzer takes not more than (a) 2, or (b) 5, or (c) 10 pulses of the TOF analyzer. The analysis time of each spot is preferably the time to acquire a mass spectrum of a sufficient or desirable signal-to-noise ratio or sensitivity for use in the pixels of the image.

The present invention may find application in any of the following:
  i. tissue imaging, e.g. as applied to anatomical pathology, especially cancer, including: fixed paraffin-embedded tissues and in combination with hematoxylin and eosin (H&E) staining;
  ii. high-content cellular screening;
  iii. microarray-based targeted assays for clinically relevant disease biomarkers;
  iv. high-throughput pharmaceutical, chemical and clinical analysis;
  v. bacterial identification and susceptibility testing (with cultures on a thin layer of media).
  vi. cytometry, including off-line flow cytometry.

In cases where the sample is a biological sample, especially clinically relevant samples, the method may further comprise using the image of the one or more elements in the sample to determine a physiological state or to diagnose a disease state in an organism from which the biological sample is derived.

The sample pre-concentration approach of the invention may provide numerous advantages such as increased pixel acquisition rate and therefore throughput of elemental imaging; reduced instrument contamination; applicability with an expanded range of elemental imaging techniques; and increased ionisation efficiency due to the presence of oxidised elemental ion species on the oxidized surface.

DETAILED DESCRIPTION OF EMBODIMENTS

In order to enable a more detailed understanding of the invention, numerous embodiments will now be described by way of example and with reference to the accompanying drawings.

Figure 1:
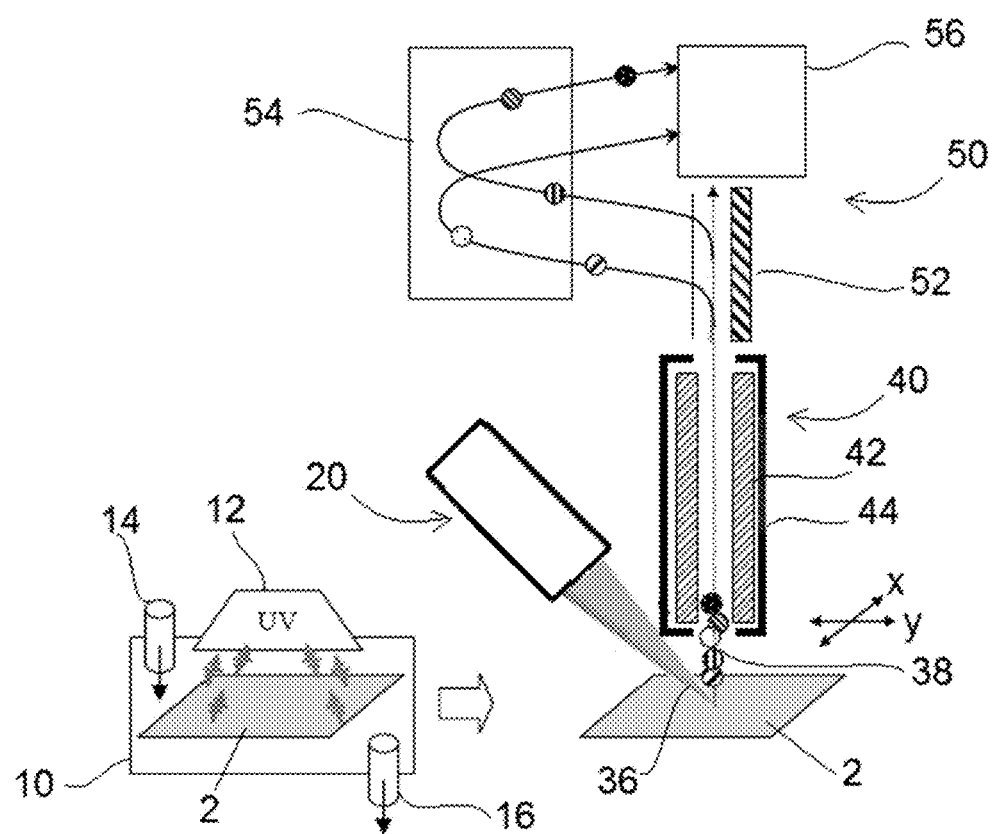
FIG. 1 shows schematically an embodiment of an apparatus for imaging one or more elements in an organic sample in accordance with the invention.

Referring to FIG. 1, there is shown schematically an apparatus for imaging one or more elements in an organic sample. A thin layer of a sample to be analysed is deposited on a slide (2). The sample may be arranged as a microarray on the slide. The slide typically is a flat glass slide with ITO coating. Alternatively, it could be a metal plate.

The sample, for example, is a bio(organic) sample such as a tissue sample or cell line. However, in general the sample is not limited to a given type. The sample could comprise any one of:
  a biological or a chemical (organic but non-biological) sample
  a fixed and embedded tissue e.g. Formalin-fixed, paraffin-embedded (FFPE) tissue, preferably cut by a microtome to preferably 3-5 µm thickness
  individual cells deposited on the slide, e.g. from a flow cytometer or a high-content screening device, for instance in a grid-like pattern (e.g. deposited every 50 µm in the X and Y directions, for a typical cell size up to 5-10 µm). Typically, no more than one biological cell occupies each grid cell or square. The cells in the grid may all be different (e.g. from different samples or experiments), or at least some, optionally all, of the cells in the grid may be from one sample or population in order to determine a variation among that sample or population
  a cell culture on a growth media, e.g. a microbial or bacterial culture on a thin layer of growth media such as agarose (preferably, the culture is up to 10 µm, or up to 20 µm thick)
  a sample, such as non-cellular sample, deposited on the slide, e.g. by an autosampler of any known type (including by flow focusing, acoustic droplet ejection, induction, etc.). the sample may be deposited as individual droplets on a grid-like pattern (e.g. every 50 µm in X and Y direction), or microarray.

For reasons described further below, in some embodiments, the slide is coated with a layer of titanium dioxide, for instance in the form of a film or immobilised particles.

In some embodiments, the sample on the slide could be analysed as it is (i.e. unprocessed, non-tagged) to determine a distribution of native heavier inorganic elements (for instance Fe, Zn, Sn, etc., e.g. for metallomics experiments). In other embodiments, the sample could be tagged, preferably with one or more elements that are non-native to the sample (herein non-native elements). Rare-earth elements are one known in the art class of elemental tags. The one or more tags are typically selective for one or more different respective targets in the sample. The tags could be applied to the sample before it is deposited on the slide or after but preferably after. The specificity of the tagging can be achieved with the help of binding members such as antibodies, aptamers, Somamers, metabolic labelling and other known methods. Tags could include polymer chains, nanoparticles (as shown in U.S. Pat. No. 8,679,858), quantum dots, etc. Tagging could also utilise multiple elements in a barcode manner as presented in US 2014/106976 and B. Bodenmiller et al., Nature Biotechnology 30 (2012) 858-867.

The next step in the method of analysing the sample comprises locating the slide containing the (tagged) sample in a reaction or oxidation chamber (10), wherein an oxidation reaction is performed to reduce the mass of the sample by removal of most of the organic matrix thereby to leave the sample containing the analyte elements of interest, typically as oxides. One or both of two approaches to oxidation could be employed. The first approach comprises using light of wavelength <400 nm, such as UV light (12), to irradiate the slide and its sample, preferably at intensities at or above 0.1-10 milliWatt/cm$^2$ and wavelength <400 nm (e.g. from a gas discharge source as known in the art). These are the embodiments where it is preferable to include a coating of titanium dioxide or other photocatalyst on the slide subjected to UV light. Titanium dioxide exhibits very strong photocatalytic properties that lead to rapid oxidation of matrix atoms. Alternatively, or in addition, a chemical oxidant, preferably ozone or hydrogen peroxide vapour, is admitted into the oxidation chamber (10) via inlet (14) and is expelled from it through an outlet (16). The sample can be heated on the slide to aid the oxidation process as known in the art.

Under the influence of the UV light, and/or the oxidants, a rapid oxidation of matrix atoms occurs: e.g. $C \rightarrow CO_2$, $N \rightarrow NO, NO_2$, $H \rightarrow H_2O$, etc. The volatile products are pumped away by a vacuum pump connected to the chamber (not shown), thus carrying away most of the sample mass. Meanwhile, heavier atoms, including the analyte elements of the tags or native heavier elements, do not form volatile products and therefore remain on the thinning layer of sample, mainly in an oxidised form. Once the process has reached saturation and most of the organic matrix is removed (preferably >90% or >99% e.g. 90-99% by wt. removed), the heavier atoms are sufficiently concentrated for subsequent analysis. The rate of the oxidation process can be regulated by control of the supply of oxidants or irradiating light power, and/or temperature of the sample. An oxidation that is too fast undesirably could result in gas bubbles carrying away heavier atoms of interest. Therefore, the rate of oxidation should be carefully balanced against sample production in the reaction chamber. The volatile products could be used for process control (e.g. to determine the time to stop the oxidation), and/or for diagnostics (e.g. to measure relative content of elements or their isotopes to get additional types of information). For example, the elements of the volatile products could be monitored. For instance, if the monitored ratio of C to O is 1:1, then this is indicative of incomplete oxidation, but if the ratio of C to O is 1:2 then this is indicative of complete oxidation to $CO_2$. In another example, isotope ratios e.g. $C^{12}/C^{13}$ could be used as process indicators. For instance, this ratio could be used to distinguish when the process has finished oxidising a bacteria culture and starts oxidizing the media (which could have different ratio $C^{12}/C^{13}$ to the bacteria).

Figure 3:
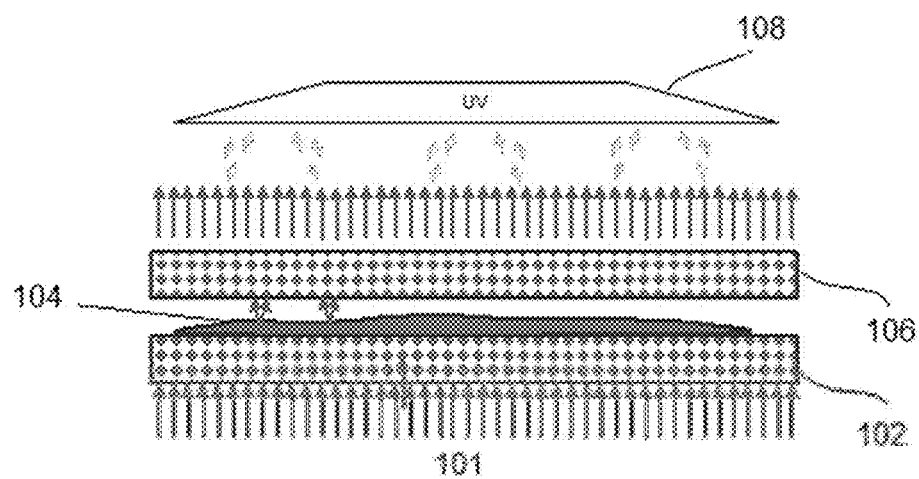
FIG. 3 shows schematically a pass-through embodiment with transfer of analytes of interest onto a counter-slide.

An alternative approach is illustrated on FIG. 3 and allows for higher rates of reaction, allowing in principle even boiling and bubbling of the sample. In this case one or more oxidizing agents (ozone, hydrogen peroxide, persulfate) are forced (101) from a supply (not shown) underneath the slide (102) that supports a sample (104), for example a sample of thin tissue. In this embodiment, there are two spaced apart, but closely separated, sample slides (102,106) each made from porous inorganic material (for example glass, ceramic, ITO etc). The one or more oxidizing agents are forced through the two closely separated sample slides. These agents rapidly diffuse through the thin tissue section producing light gases on the way (i.e. volatile products). This mixture continues to flow through a 5-10 micrometer gap from the sample slide (102) to the counter-slide (106) and through the latter. If sample is sufficiently lyophilised, it could actually brought in direct contact with the counter-slide (106). The size of pores in the counter-slide is chosen in such a way (preferably, in the range of 1-10 nm) that non-volatile heavier elements and their oxides cannot get into the pores and remain on the surface of the counter-slide for subsequent analysis. Thus, imaging analysis, as described herein, can be performed on the counter-slide. With a sufficiently small gap between the slides, the spatial distribution of the heavier elements in the sample is substantially preserved. This pass-through approach allows faster oxidation process without any loss of analytes of interest even when bubbles are formed. Preferably, the counter-slide is transparent in the UV range to enable ozone formation and titanium dioxide reactions (e.g. where the sample substrate comprises a titanium dioxide surface) aided by UV radiation from a UV source (108). This can promote oxidation processes.

Reaction could be facilitated also by a focused laser rastered across the surface. In one type of embodiments, the power of the laser can be high enough to create local heating that accelerates the breakdown of organics and the rate of oxidation.

It should be understood that multiple sample slides could be processed simultaneously in the oxidation chamber.

For subsequent analysis, the sample is taken from the reaction chamber and transferred to a device capable of rapid imaging of multiple elements in parallel, preferably with an acquisition rate >100, or >1000 pixels/second (e.g. 100-1000 pixels/second, or 2000 pixels/second). The rate may be up to $10^5$ pixels/second in some cases. The pixel size for such a rate of acquisition may be 10 μm or less, or 5 μm or less, or 2 μm or less, or ideally of sub-cellular resolution of 1 μm or less (e.g. 0.5-1.0 μm). It should be noted that the reaction chamber could be alternatively integrated with the imaging device, which would be preferable if, e.g., some means within the latter (e.g. ion or electron gun, or X-ray gun of the imaging analyzer) could be used to accelerate the oxidation.

Figure 2:
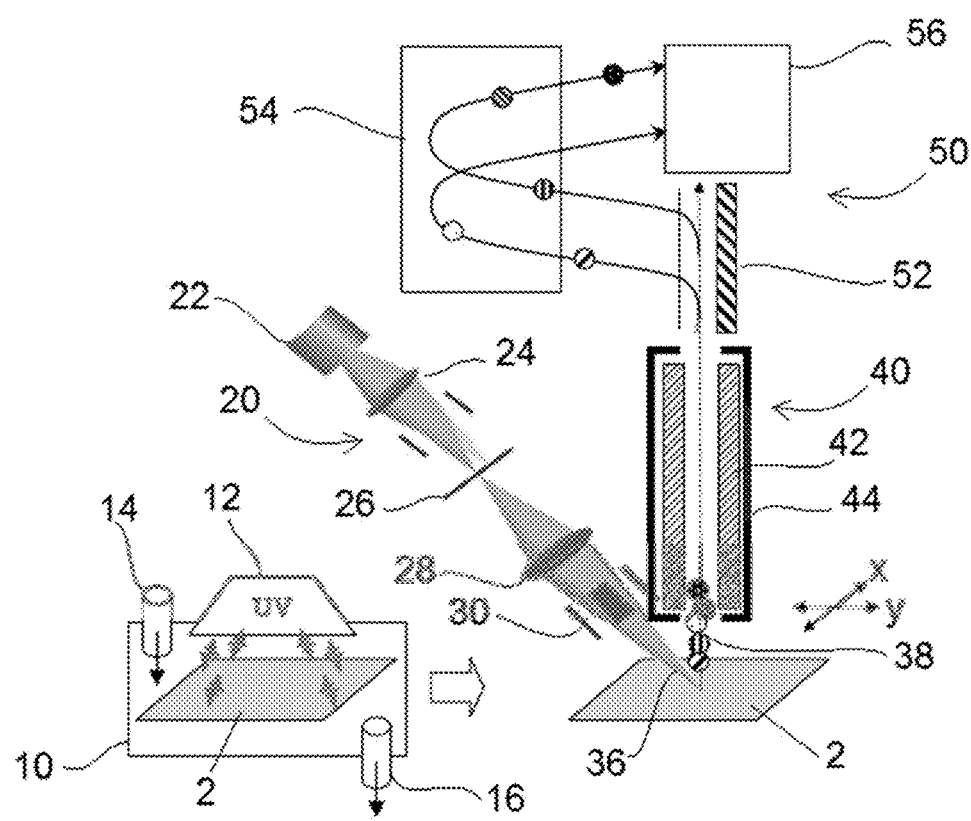
FIG. 2 shows schematically another embodiment of an apparatus for imaging one or more elements in an organic sample in accordance with the invention.

A preferred imaging device in the form of a secondary ion mass spectrometer (SIMS) or LPI (laser plasma ionisation) mass spectrometer is shown in FIG. 1. It comprises a high brightness laser or ion gun (20) as an irradiation means to produce ions from the sample. Referring to FIG. 2, which shares many of the same features as FIG. 1, there is shown more detail of an ion gun (20) as a source of primary ions to irradiate the sample. The ion gun includes ionisation chamber (22), lens system (24), optional collimator system (26), focusing optics (28) to focus the ion beam to a small spot on the sample surface, and raster electrode plates (30) to scan the ion spot across the sample. The primary ion beam ionises the elemental tags or native heavier elements of interest and causes them to be emitted from the surface. Laser ablation (LA) or laser plasma ionisation (LPI) could alternatively be used, preferably at high fluences >1-10 Joules/cm$^2$ to facilitate dissociation of molecular bonds and release of ions of elements. Scanning of the continuous primary beam (ion or laser beam) allows to image the sample faster than mechanical movement of the sample support enables. Typically, a combination of rastering by deflection plates over 0.5×0.5 or 1×1 mm area could be combined with mechanical rastering over larger distances, e.g. 50×100 or 100×200 mm.

Generally, a continuous high-intensity primary ion beam (36) of up to 100 nA in a 1 μm spot is generated. For example, a suitable ion source is an oxygen ion beam generated using an RF gas phase ion source as described in N. S. Smith, Appl. Surf. Science, 255 (2008) 1606-1609). This creates secondary ions (38) from the sample surface comprising the elemental tags at an intermediate vacuum pressure of $10^{-5}$-$10^{-2}$ mbar in the chamber that houses the sample, thus reducing, in comparison to typical SIMS instruments, any requirements on sample desiccation and transfer time. In general, the ions produced from the sample by SIMS or LPI are produced at an intermediate vacuum pressure of $10^{-5}$-$10^{-2}$ mbar in the chamber that houses the sample.

The produced ions (38) (secondary ions in the case of using primary ions to irradiate sample) are accelerated through a short gas-filled radiofrequency (RF)-driven ion guide or collision cell (40) at elevated pressure (typically >$10^{-2}$ mbar) in which all ions of m/z below the mass range of the tags (or their oxides) are eliminated. The emittance of the ion beam is also reduced as the ions pass through the guide. The RF ion guide typically comprises a multipole, such as quadrupole (42) located in a gas filled enclosure (44). Such elevated pressure in the RF ion guide or collision cell, unlike in U.S. Pat. No. 7,910,882, allows the use in the ion guide of an optional reactive gas (especially an oxidising gas, such as NO, $O_2$ for example) in order to substantially oxidise most of the metal ions to oxides as known in the art (see e.g. G. Koyanagi, D. Bohme. J. Phys. Chem. A, 105 (2001) 8964-8968, S. Tanner, V. Baranov, D. Bandura, Spectrochimica Acta B, 57 (2002) 1361-1452) and thus reduce interferences by monitoring the oxides of the elements or tags and increase the number of channels to be analysed in parallel. Thus, in certain embodiments, the ion guide is configured as a reaction cell. Preferably, the RF ion guide has a DC gradient to accelerate and control transport of ions.

After passing through the RF ion guide (40), the produced ions (38) of elemental tags or native elements are mass analysed using a high-speed, orthogonal acceleration (OA) TOF-mass spectrometer (50) as known in the art, but preferably operating at 50-100 kHz repetition rate (i.e. such that there are multiple MS scans per spot (pixel) of the sample ionised). Preferably, as shown in FIG. 1, this TOF-MS has a gridless orthogonal accelerator (52) as described in WO 01/11660, single-stage ion mirror (54) and high dynamic range detector (56) comprising an electron multiplier, e.g. as described in any of: U.S. Pat. No. 6,940,066, U.S. Pat. No. 6,864,479, US 2013/264474 or others. The produced ions (38) are thereby separated by their m/z and detected as shown. The TOF analyzer enables a wide mass range of ions to be analysed simultaneously. Preferably, there are a plurality of analyte elements to be analysed (imaged).

Scanning of the sample surface is implemented by steering (raster) plates of the ion gun or using moving mirror in case of laser and/or by moving the sample stage (e.g. in x and/or y directions). A higher spatial resolution for sub-cellular and sub-organelle resolution could be achieved by using a thinner sample (e.g. a tissue slice thickness of 3 μm and thinner), and/or stronger spatial focusing of the primary ion beam and lower primary beam current to reduce space charge defocusing.

Due to the above mentioned high primary ion current or use of powerful lasers, the secondary ion current from the produced ions could reach up to hundreds of picoamperes (pA) (e.g. up to 100, 200, 500, or 1000 picoamperes, or more), with ions of analyte elements (or tags) constituting a significant proportion of the current. This means that an entire pixel could be analysed in just 1 TOF MS pulse, allowing the acquisition rate to approach $10^5$ pixel/sec in some applications (e.g. analysing iron in brain slices). Therefore, an entire slide could be analysed within a minute, thus greatly reducing the cost per analysis. Images of 500×500 pixels or more may be produced, which are suitable for histological images. The image may be a 500×500 μm field of the sample (e.g. with a pixel size of 1 μm). Compared to traditional fluorescence detection of tagged samples, the method of the invention provides a readout equivalent to up to tens to a hundred colours or channels and at a speed comparable with single-colour measurement.

It can be seen from the description above and FIG. 1 that various preferred imaging arrangements can be used to image the elements in the reacted or oxidised sample. In one arrangement, laser plasma ionization can be used to produce ions from the sample which are caused to enter a downstream reaction cell (wherein the composition and emittance of the produced ions is altered, preferably towards smaller variation) and thereafter to enter a mass analyzer, preferably a TOF mass analyzer. The laser plasma ionization can be scanned across the sample to enable an elemental image of the sample to be obtained. In another arrangement, a SIMS system can be used in which a beam of primary ions is used to produce secondary ions from the sample, which are caused to enter a downstream reaction cell (wherein the composition and emittance of the produced ions is altered, preferably towards smaller variation) and thereafter to enter a mass analyzer, preferably a TOF mass analyzer. The beam of primary ions can be scanned across the sample to enable an elemental image of the sample to be obtained.

This described method may also provide higher absolute sensitivity of analyte element detection approaches due to an increased ion yield due to the presence of oxidized analyte element atoms on the oxidised surface as known in the art. With an ionisation efficiency of 0.1-1% and low-loss transport under vacuum conditions, the SIMS or LPI method may provide an order of magnitude advantage over e.g. LA/ICP-MS due to high losses (typically, resulting in $1\times10^4$-$1\times10^5$ fold losses) during transport in the latter method. On the other hand, the proposed method of sample treatment is fully compatible with LA/ICP-MS as well, where it could also reduce sample contamination and carryover.

The results of the analysis could be presented in an analogue or quantitative mode (e.g. determining how much of an element or tag is present, as a concentration, preferably taking into account matrix effects) or in a digital or qualitative mode (e.g. determining if an element or tag is present or not). The results may be assembled by software into an image, e.g. an image of the elemental distribution (and thus a target distribution where the element was tagged to a target in the sample).

As an example of a workflow applying the invention, the following steps are given:
1) preparing a sample, for example tissue sample,
2) oxidizing the sample with light by photocatalysis and/or with chemical oxidizing agents to remove nearly all of the organic matrix;
3) irradiating the oxidized sample surface by a continuous-current ion gun or focused laser pulses with a spatial resolution of 0.5-10 μm with such intensity that the sample is broken down to constituent elements that are released from the surface as ions; the irradiation spot is scanned across the area of the sample surface that it is desired to analyze;

4) using a mass spectrometer detecting signals from the ions of elements in parallel (multichannel detection) for each and every irradiation spot;
5) determining a presence or an absence of spatial distribution of elements in the sample based on the mass spectrometric information.

Variations to such a workflow can be made in accordance with the description above, e.g. element distributions could be used as proxies for corresponding antigens when used as element tags.

As an alternative to the primary ion method of ionisation of the SIMS imaging analyzer of FIG. 2 described above, other ionisation methods in vacuum useful for mass-spectrometric analysis could be used: such as laser plasma ionisation, or laser ablation with laser post-ionisation. It should be noted that laser radiation alternatively could be delivered from the back of the slide, thus utilizing its transparency and simplifying the optical system.

As alternatives to the mass analysis of ions generated from the sample surface, other, e.g. non-destructive, methods of elemental imaging could also be used for imaging of elemental tags, for example:

micro X-ray fluorescence (µXRF), which allows analysis at atmospheric pressure conditions, preferably wherein a multi-element detector is used to allow parallelisation of detection X-ray photoelectron spectroscopy (XPS)

electron micro probe analyzer (EMPA), especially when integrated with an electron microscope secondary electron spectrometry (SES)

energy dispersive X-ray microanalysis, preferably using silicon drift detectors

Any of the techniques of elemental imaging could be combined with other modes of imaging of the sample (e.g. optical imaging). Such optical imaging could be used as an internal standard for improved quantitation of the sample.

From the above description, the invention can be seen to comprise providing a substrate or surface with a thin-layer of a (bio-)organic sample that is subjected to an oxidation process that converts organic matrix, e.g. C, H, N, O, S, into volatile species that enter the gas phase and leave behind mainly heavier inorganic elements in the sample, in particular in oxidised form. The resulting sample is subjected to high-speed imaging analysis of the remaining heavier elements by mass spectrometry or other techniques in vacuum in order to measure the spatial distribution of the elements in the sample.

In embodiments, the invention enables an elemental imaging mass spectrometer, which is capable of delivering subcellular lateral resolution in combination with highly multiplexed sample readout at a much higher throughput and low cost per analysis. The invention is preferably based on secondary ion or laser plasma mass spectrometry in vacuum with time-of-flight mass analysis (FIG. 1).

The invention finds application in many of today's high-growth markets such as:

tissue imaging, e.g. as applied to anatomical pathology, especially cancer;

microarray based targeted assays for known clinically relevant disease biomarkers or biomarkers panels and for use in life sciences research and development;

high content cellular screening;

high-throughput pharmaceutical and clinical analysis;

bacteria identification and antibiotic susceptibility testing.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" means "one or more".

Throughout the description and claims of this specification, the words "comprise", "including", "having" and "contain" and variations of the words, for example "comprising" and "comprises" etc, mean "including but not limited to", and are not intended to (and do not) exclude other components.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. An apparatus for imaging one or more analyte elements in a sample, comprising:

a reaction chamber to receive the sample, wherein the sample is provided as a sample layer on a substrate;

wherein the reaction chamber comprises an electromagnetic radiation source or an inlet for introducing into the chamber one or more chemical or ionic oxidizing agents for oxidizing the sample in an oxidation reaction to produce one or more volatile products that leave it and enter the gas phase, whilst the one or more analyte elements remain in the sample and are spatially disturbed by the oxidation on average not more than the spatial resolution of the imaging analysis; wherein a majority of the sample layer by weight is removed from the substrate by the oxidation and the remaining sample layer is concentrated in the one or more elements; and, an imaging elemental analyzer in a detection chamber for detecting the spatial distribution of the one or more analyte elements in a concentrated sample layer.

2. The apparatus of claim 1 wherein the imaging elemental analyzer comprises a data acquisition system that receives input from the detection of the one or more elements and generates an image of the one or more elements in the concentrated sample layer.

3. The apparatus of claim 1 wherein the sample is a biological sample selected from tissue, bacteria and cells and wherein the one or more elements are naturally occurring in the sample and/or have been introduced into the sample as elemental tags.

4. The apparatus of claim 1 wherein the oxidizing removes at least 60%, or at least 70%, or at least 80%, or at least 90%, or at least 95%, or at least 99%, or at least 99.9%, or at least 99.99%, or between 90% and 99%, or between 90% and 99.9% of the sample layer by weight.

5. The apparatus of claim 1 wherein the radiation source comprises an ultraviolet light or X-ray light source.

6. The apparatus of claim 1 wherein connected to the inlet is a source of one or more chemical oxidizing agents, wherein the one or more oxidizing agents are selected from: ozone, persulfate and hydrogen peroxide.

7. The apparatus of claim 1 wherein the imaging elemental analyzer is selected from: a secondary electron spectrometer, an X-ray photoelectron spectrometer, an X-ray fluorescence spectrometer, a radioactivity analyzer and a mass spectrometer.

8. The apparatus of claim 1 wherein the imaging elemental analyzer comprises a primary particle source for generating a beam of primary particles and focusing the beam to a localized spot on the surface of the sample to emit secondary particles from the spot and comprises a secondary particle analyzer for analyzing the secondary particles to determine the presence and optionally quantity of the one or more elements at the spot, wherein the primary particle source is configured to move the spot to a plurality of locations on the surface of the sample over time, thereby to obtain an image of the one or more elements in the sample wherein each location of the spot on the surface of the sample corresponds to a pixel of the image.

9. The apparatus of claim 1 wherein the imaging elemental analyzer can acquire the image at a rate of at least 100 pixels per second or at least 1000 pixels per second or in the range of 1000-10000 pixels per second.

10. The apparatus of claim 8 wherein the primary particles are selected from photons, electrons and ions and wherein the secondary particles are selected from photons, electrons and ions and wherein the energy of the primary particles exceeds 1 keV.

11. The apparatus of claim 8 wherein the imaging elemental analyzer is an imaging secondary ion mass spectrometer (SIMS) configured to be pumped to a vacuum, wherein the primary particles are ions that are formed in the source at a pressure below 1 mbar and wherein the secondary particles are ions for analysis by a mass analyzer of the SIMS.

12. The apparatus of claim 8 wherein the primary and secondary particles are ions and the imaging elemental analyzer comprises a mass analyzer, wherein the mass analyzer is selected from: a time-of-flight (TOF) mass analyzer, a distance-of-flight mass analyzer, a quadrupole ion trap mass analyzer, an electrostatic trap mass analyzer, an Ion Cyclotron Resonance mass analyzer, and a magnetic sector mass analyzer or an array or combination thereof.

13. The apparatus of claim 8 wherein the imaging elemental analyzer comprises an RF ion guide for receiving the secondary ions after they are emitted from the surface and transferring the secondary ions into the mass analyzer.

14. The apparatus of claim 13 wherein the ion guide is configured to receive a reactive gas that fills the ion guide for producing reaction products with the secondary ions, wherein the secondary ions are ions that comprise one or more of the elements.

15. The apparatus of claim 12 wherein the mass analyzer is a TOF mass analyzer and the repetition rate of the TOF mass analyzer is at least or is higher than (a) 5 kHz, or (b) 20 kHz, or (c) 50 kHz, or (d) 100 kHz.

16. An imaging elemental analyzer for imaging one or more analyte elements in a sample, comprising:
a chamber for housing a sample containing one or more analyte elements to be imaged, wherein the pressure inside the chamber surrounding the sample is in the range $10^{-5}$ to $10^{-2}$ mbar;
at least one irradiation means selected from: (i) an ion gun for irradiating the sample with a high intensity beam of primary ions, wherein the primary ions are formed in the ion gun at a pressure below 1 mbar, wherein the ion gun is for focusing the beam of primary ions to a localized spot on the surface of the sample and for moving the spot to a plurality of locations on the surface of the sample over time; (ii) a laser for irradiating a localized spot on the surface of the sample and for moving the spot to a plurality of locations on the surface of the sample over time;
a gas-filled RF ion guide for receiving produced ions comprising the analyte elements released from the sample in response to irradiation by the primary ions or the laser, wherein the RF ion guide prevents onward transmission of all ions of m/z below the mass or mass range of the analyte elements; and
a time of flight (TOF) mass analyzer for receiving the secondary ions or reaction products of the secondary ions from the RF ion guide, wherein the TOF mass analyzer is configured to have a repetition rate of at least 5 kHz.

* * * * *